United States Patent Office 3,203,946
Patented Aug. 31, 1965

3,203,946
POLYMERIZATION OF ETHYLENE IN THE PRESENCE OF AMMONIUM HALIDE
Isidor Kirshenbaum, Westfield, Peter Lucchesi, Newark, and Erik Tornqvist, Roselle, N.J., assignors to Esso Research and Engineering Company, a corporation of Delaware
No Drawing. Filed Feb. 23, 1962, Ser. No. 175,305
9 Claims. (Cl. 260—94.9)

This invention relates to improved catalysts for polymerizing ethylene. More particularly, it relates to a process wherein the ethylene is polymerized in the presence of a minor amount of an ammonium halide.

The use of the so-called Fischer catalyst system of aluminum metal, aluminum chloride, and titanium tetrachloride for polymerizing ethylene to solid polymers is well known. In an effort to increase the catalyst efficiency and yield of solid polymer, it is also well known to utilize larger amounts of aluminum. Despite the increased concentrations of aluminum, it is still desirable to further improve the operation and produce a polyethylene product suitable for blow molding purposes by decreasing the melt index and increasing molecular weight.

It has now been found that these purposes can be achieved by carrying out the ethylene polymerization in the presence of a minor amount of an ammonium halide in adidtion to the before-mentioned basic catalyst components.

It is surprising that these improvements are obtained through the use of ammonium halides since other salts such as sodium chloride and other related materials such as quaternary ammonium salts do not provide comparable results.

The polyethylenes produced by the catalysts of this invention thus have a molecular weight range of 200,000 to 400,000 (as determined by intrinsic viscosity using the Chiang equation, J. Polym. Sec., 36, 91, 1959) and a melt index of 0.1 to 0.8 as contrasted with molecular weights of 120,000 to 180,000 or less and melt indexes of 1–5 or more when the ammonium halide is not employed. We have also found that the polyethylene produced in accordance with this invention has higher Izod notched impact resistance than do the polyethylenes produced when ammonium halides are not employed.

The components of the catalyst in addition to the ammonium halide are used in the proportion of 1 to 12 moles, preferably 1 to 3 moles of aluminum and 0.1 to 3 moles and preferably 0.3 to 2 moles of $AlCl_3$ per mole of $TiCl_4$. We have also found that in the presence of added hydrogen gas, $VCl_4$ may be used as a transition metal compound in admixture with Al and $AlCl_3$.

It is particularly preferred that the non-ammonium halide, catalyst components be prepared by contacting a finely divided aluminum powder with at least a portion of the aluminum chloride and then admixing the thus contacted materials with the remaining transition metal tetrachloride; as described in U.S. patent application Serial No. 161,353, filed December 22, 1961.

The three catalyst components are disposed in an inert hydrocarbon diluent of the aliphatic series, i.e., a straight or branched chain, $C_5$ to $C_{15}$ aliphatic hydrocarbon, as well as cycloparaffins. The quantities of diluent that can be employed range from 5 to 1000 volumes of diluent per total volume of catalyst components, preferably 100 to 500 volumes of diluent per volume of catalyst. However, a trace of an aromatic diluent such as benzene or an alkyl benzene may be present in addition to the aliphatic diluent.

The ammonium halide is employed in an amount of 1.5 to 4.5 millimoles per gram of catalyst. Particularly preferred are ammonium chloride and bromide. The preferred concentration range depends upon the composition and activity of the catalyst. Thus, when one is using a $3Al/1AlCl_3/1TiCl_4$ catalyst having an activity corresponding to 100–125 grams polymer per gram $TiCl_4$ in one hour, the preferred concentration range of $NH_4Cl$ is 2–3 millimoles/gram of total catalyst while when one is using a 3/1/2 catalyst having an activity corresponding to 150 gram/gram/hour, it is preferred to use not less than 3.5 millimoles of $NH_4Cl$/gram of total catalyst.

The ammonium halide can be added to the catalyst before or after dispersion in the diluent or can be injected continuously in the reactor. It is preferred to use C.P. $NH_4Cl$ which does not contain extraneous moisture.

It is important to note that the improved catalyst thus obtained permits the use of relatively small quantities thereof in the reaction thus simplifying deashing problems. For instance, catalyst concentrations as low as 0.5–2 grams per liter of diluent can be advantageously used with good monomer conversion still taking place.

The reaction itself is conducted by placing the catalyst in the polymerization reactor with preferably from 100 to 2000 parts of hydrocarbon diluent, as stated above, and from 20 to 200 grams of ethylene per gram of catalyst is injected therein. The reaction mixture is then heated to a temperature of from 70° to 110° C., preferably 80° to 100° C., for a time of from 0.1 to 10 hours, preferably 0.5 to 4 hours, during which time more monomer can be added so as to maintain the total pressure at the desired level which is preferably in the range of 50 to 500 p.s.i.g. The amount of ethylene thus added will, of course, be determined by catalyst activity, reaction time, diluent volume, desired monomer concentration, etc., but may advantageously be in the range of 50–300 grams monomer per gram total catalyst when the reaction is carried out batchwise. Normally it is desirable for good operability to limit the concentration of polymer in the diluent to less than 25 wt. percent. If necessary, the polymer concentration may be maintained at or below this level by addition of more diluent during the polymerization.

The polymerization may, of course, also be carried out in a continuous operation, in which case the catalyst components, slurried in sufficient diluent, may be added to the reactor either separately or previously combined. Separate streams of additional diluent and of monomer are also continuously added so as to maintain a suitable polymer concentration in the diluent, preferably in the range of 5–25 wt. percent, to achieve desirable monomer concentration and to obtain a high catalyst efficiency, i.e., in the range of 50–500 grams polymer per gram catalyst. At the end of the reaction, the solid polymer is precipitated with about an equal quantity of a $C_1$ to $C_6$ alcohol such as ethyl alcohol, isopropyl alcohol, n-butanol, and the like. The precipitated product is then filtered and washed with more alcohol advantageously containing dry HCl or another suitable acid to facilitate the deashing, the removal of traces of unreacted aluminum in particular. The filtration and deashing step may be repeated one or more times if needed to obtain desirably low ash levels. The polymer may then be finished by the addition of suitable stabilizers and inhibitors followed by drying according to methods well known in the polymer field.

This invention and its advantages will be better understood by reference to the following examples:

EXAMPLE 1.—CONTROL WITHOUT $NH_4Cl$

A catalyst mixture (1.44 grams) of $Al/AlCl_3/TiCl_4$ in a 3/1/1 mole ratio was prepared by mixing the components in 1 liter of dry n-heptane in a 1-liter addition funnel. The catalyst diluent mixture was then transferred to a magnetically agitated 2-liter stainless steel Recipromix unit. Ethylene was pressured in at room temperature to a pressure of about 60 p.s.i.g. This usually corresponded to an ethylene addition of about 30 grams. The reactor was then heated to 90° C. and kept at this temperature for 1 hour under continuous agitation. More ethylene was added from the moment the temperature reached 90° C. and until the termination of the reaction to maintain the pressure between 90 and 100 p.s.i.g. The polymerization was terminated by the addition of a small amount of isopropyl alcohol and the polymer worked up as outlined above.

EXAMPLE 2.—WITH NH₄Cl

The same catalyst and reaction conditions as described in Example 1 were used, except that 0.141 gram of $NH_4Cl$ was added to the catalyst in the addition funnel.

EXAMPLE 3.—WITH NH₄Cl

An experiment was carried out as in Example 2 but this time with 0.282 gram of $NH_4Cl$ added to the catalyst. The results reported in Table I clearly show the effect of $NH_4Cl$.

*Table I.—Ethylene polymerization in 2-liter recipromix unit*

| Example No. | 1 | 2 | 3 |
|---|---|---|---|
| Gram NH₄Cl | 0 | 0.14 | 0.28 |
| Millimoles NH₄Cl/gram of catalyst | 0 | 1.8 | 3.6 |
| Melt Index (190°) | 1.7 | 0.7 | 0.14 |
| Density | 0.95 | 0.95 | 0.95 |
| Polymer yield gram/gram TiCl₄ | 125 | 125 | 96 |

EXAMPLE 6.—WITH NH₄Cl

The same as Example 5 except that 0.40 gram of $NH_4Cl$ was added. The following results in Table II show that while the $NH_4Cl$ concentration will vary with catalyst composition, the melt index of the polymer can be controlled in the desirable range.

*Table II.—Ethylene polymerization in 2-liter recipromix unit*

| Example No. | 4 | 5 | 6 |
|---|---|---|---|
| Gram NH₄Cl | 0 | 0.212 | 0.40 |
| Millimoles NH₄Cl/gram of catalyst | 0 | 1.8 | 3.5 |
| Melt Index (190°) | 1.3 | 0.7 | 0.4 |

To test the effect of other chloride salts, an experiment was carried out using NaCl as the additive.

EXAMPLE 7.—CONTROL WITH OTHER SALTS

The same catalyst and reaction conditions as in Example 1, except that 0.152 gram of NaCl was added to the catalyst mixture. A very poor polymer yield of 16 gram/gram/TiCl₄ was obtained as contrasted to the 96–125 gram/gram/TiCl₄ obtained with $NH_4Cl$.

EXAMPLES 8–17

Experiments were conducted under conditions similar to those described in the preceding examples except for the use of other ammonium salts and other related materials instead of ammonium chloride. The results and conditions are tabulated below:

*Table III.—Effect of additives on ethylene polymerization*

[90° C.; 90–100 p.s.i.g.; n-heptane; 1 hour]

| Example No. | 8 | 9 | 10 | 11 | 12 |
|---|---|---|---|---|---|
| Al/AlCl₃/TiCl₄ Mole ratio | 3/1/2 | 3/1/2 | 3/1/2 | 3/1/2 | 3/1/2 |
| Additive | None | NH₄Cl | (NH₄)₂SO₄ | NH₄(acetate) | (NH₄)₂HPO₄ |
| Gram/gram catalyst | | 0.189 | 0.165 | 0.095 | 0.175 |
| Millimole/gram catalyst | | 3.5 | 1.25 | 1.24 | 1.33 |
| Polymer: | | | | | |
| Gram/gram/hour (total catalyst) | 100 | 92 | 32 | 16 | 12 |
| Melt Index @ 190° C | 2.0 | 0.80 | 0.37 | 0.23 | 0.10 |
| Mole wt. × 10⁻³ | 150 | 210 | 280 | 320 | 400 |

| Example No. | 13 | 14 | 15 | 16 | 17 |
|---|---|---|---|---|---|
| Al/AlCl₃/TiCl₄ Mole ratio | 3/1/2 | 3/1/2 | 3/1/1 | 3/1/2 | 3/1/1 |
| Additive | (CH₃)₄NCl | (C₂H₅)₄NBr | a HCONH₂ | b (CH₂NH₂)₂·2HCl | c C₅H₅N |
| Gram/gram catalyst | 0.189 | 0.260 | 0.039 | 0.080 | 0.100 |
| Millimole/gram catalyst | 1.72 | 1.23 | 0.87 | 0.59 | 1.25 |
| Polymer: | | | | | |
| Gram/gram/hour (total catalyst) | 77.5 | 99.0 | 41.5 | 29.3 | 37.0 |
| Melt Index @ 190° C | 1.5 | 2.0 | 0.55 | 0.35 | 0.10 |
| Mole wt. × 10⁻³ | 195 | 175 | 290 | 295 | 430 | a Formamide.
b Ethylene diamine hydrochloride.
c Pyridine.

It is evident that the $NH_4Cl$ addition of as little as 0.1 gram/gram of catalyst reduced the melt index into the desirable range. Polymer yields were uniformly high in the above samples.

EXAMPLE 4.—CONTROL WITHOUT NH₄Cl

A catalyst mixture (2.12 grams) comprising Al/AlCl₃/TiCl₄ in a 3/1/2 mole ratio in 1 liter of n-heptane was introduced into the 2-liter Recipromix reactor. Ethylene was then added to the reactor and polymerized as described in Example 1.

EXAMPLE 5.—WITH NH₄Cl

The same catalyst and reaction conditions as in Example 4, except that 0.212 gram $NH_4Cl$ was added to the catalyst.

These data show:
(1) Whereas all of the ammonium salts $NH_4Cl$, $(NH_4)_2SO_4$, $NH_4(Acetate)$, and $(NH_4)_2HPO_4$ all have the beneficial effect of decreasing the melt index, only $NH_4Cl$ does so with high polymer yields.
(2) The quaternary tetraalkyl ammonium salts $(CH_3)_4NCl$ and $(C_2H_5)_4NBr$ show little, if any, effect on melt index.
(3) The other additives also decreased melt index but lowered polymer yield excessively as compared to $NH_4Cl$.

It is also contemplated within this invention to add both an ammonium halide and hydrogen to the reaction system. The ammonium halide increases molecular weight, whereas, the hydrogen decreases it. This combination thus provides flexibility of molecular weight control and distribution. This is demonstrated in Example 18 below.

EXAMPLE 18

A 3/1/1 catalyst (see preceding examples) was utilized in the polymerization of ethylene at 90° C. and 100 p.s.i.g. The catalyst was utilized in an amount of 1.44 gram/liter of diluent along with 0.292 gram ammonium chloride per gram catalyst and about 40 p.p.m. (wt.) hydrogen in the ethylene feed. The conditions were thus similar to Examples 1 and 3. The polyethylene obtained had a melt index of 0.91, a molecular weight of 200,000 and was obtained in a yield of 148 gram/gram $TiCl_4$. The molecular weight was thus effectively reduced while still obtaining very good polymer yields.

The advantages of this invention will be apparent to the skilled in the art. Improved catalyst systems are provided for employing ethylene to products of superior characteristics in high efficiencies.

It is to be understood that this invention is not limited to the specific examples which have been offered merely as illustrations and that modifications may be made without departing from the spirit of the invention.

What is claimed is:

1. In a process for preparing solid crystalline polyethylene, having a molecular weight in the range of about 200,000 to 400,000, by polymerizing ethylene with a catalyst of aluminum, $AlCl_3$ and $TiCl_4$, at a temperature in the range of 70° to 110° C. and a pressure in the range of 50 to 500 p.s.i.g., the improvement which comprises carrying out the polymerization in the presence of a minor amount of an ammonium halide.

2. The process of claim 1 in which the ammonium halide is ammonium chloride.

3. The process of claim 2 in which the ammonium chloride is utilized in an amount of about 1.5 to 4.5 millimoles per gram of catalyst.

4. The process of claim 1 in which from 1 to 12 moles of aluminum and 0.1 to 3 moles of $AlCl_3$ are utilized per mole of $TiCl_4$.

5. A catalyst suitable for the polymerization of ethylene comprising from 1 to 12 moles of aluminum and 0.1 to 3 moles of $AlCl_3$ per mole of $TiCl_4$, and 1.5 to 4.5 millimoles of an ammonium halide per gram of catalyst.

6. The catalyst of claim 3 in which the ammonium halide is ammonium chloride.

7. The catalyst of claim 6 in which the moles of aluminum and $AlCl_3$ are respectively 3 and 1.

8. The catalyst of claim 6 in which the molar ratio of aluminum, $AlCl_3$, and $TiCl_4$ is 3/1/2.

9. In a process for preparing solid crystalline polyethylene, having a molecular weight in the range of about 200,000 to 400,000, by polymerizing ethylene with a catalyst of aluminum, $AlCl_3$ and $TiCl_4$, at a temperature in the range of 70° to 110° C. and a pressure in the range of 50 to 500 p.s.i.g., the improvement which comprises carrying out the polymerization in the presence of a mixture of catalyst and $NH_4Cl$ comprising from 1 to 12 moles of aluminum and 0.1 to 3 moles of $AlCl_3$ per mole of $TiCl_4$, and 1.5 to 4.5 millimoles of ammonium chloride per gram of catalyst.

References Cited by the Examiner

UNITED STATES PATENTS

| | | | |
|---|---|---|---|
| 2,899,418 | 8/58 | Reynolds | 260—94.9 |
| 3,019,216 | 1/62 | Schmerling | 260—94.9 |
| 3,093,625 | 6/63 | Friederich et al. | 260—94.9 X |

JOSEPH L. SCHOFER, *Primary Examiner.*